Patented July 25, 1950

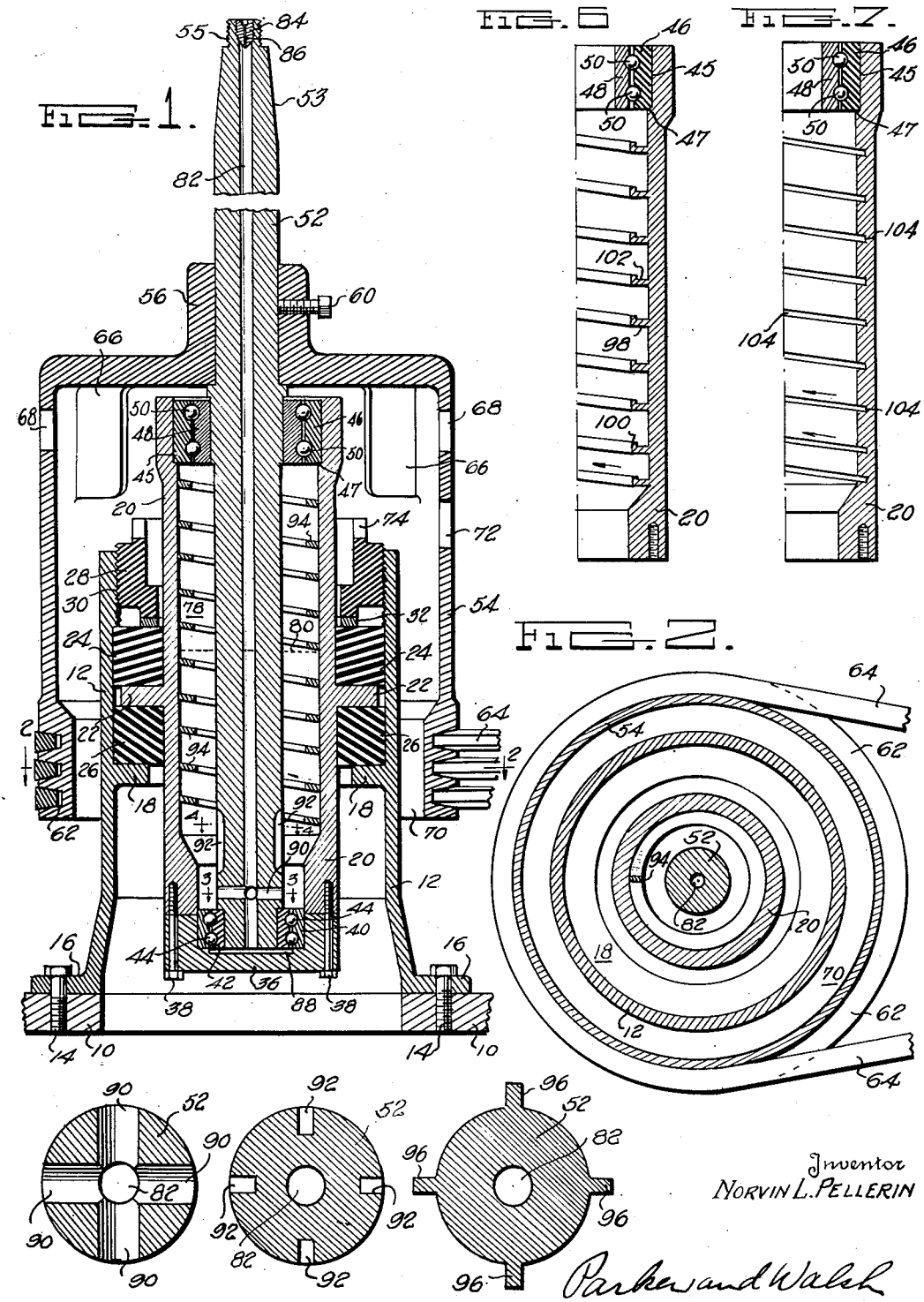

2,516,252

UNITED STATES PATENT OFFICE 2,516,252

EXTRACTOR DRIVE SHAFT LUBRICATOR

Norvin Leroy Pellerin, New Orleans, La.

Application July 7, 1948, Serial No. 37,452

9 Claims. (Cl. 308—168)

The present invention relates generally to the centrifugal extractor drive assembly of a laundry machine.

More particularly this invention relates to improved apparatus for lubricating the spaced upper and lower bearings of a centrifugal extractor drive assembly.

The principal object of the invention is to provide an extractor drive assembly of the type described embodying a substantially closed self-contained bearing assembly.

Another object of the invention is to provide a bearing assembly for an extractor drive of the type described embodying an internal oil reservoir together with self-contained apparatus for positively lubricating the upper bearing at all times during operation of the device regardless of the amount of oil in the system.

Another object of the invention is to provide a self-contained, lubricated bearing assembly of the type described wherein the quantity of oil within the system may be readily determined and replenished, if necessary, without disassembly.

Other objects and advantages of the invention will become apparent during the course of the following description.

In the drawings I have shown several embodiments of the invention. In this showing:

Figure 1 is a vertical cross-sectional view illustrating a preferred form of extractor drive assembly in accordance with the present invention;

Figure 2 is a transverse cross-sectional view through the assembly taken substantially along the line 2—2 of Figure 1;

Figure 3 is a transverse cross-sectional view to an enlarged scale through the drive shaft taken substantially along the line 3—3 of Figure 1;

Figure 4 is a transverse cross-sectional view to an enlarged scale through the drive shaft taken substantially along the line 4—4 of Figure 1;

Figure 5 is a transverse cross-sectional view similar to Figure 4, but illustrating another form of drive shaft; and Figures 6 and 7 are fragmentary vertical cross-sectional views of a portion of the bearing housing of Figure 1, respectively illustrating two different modified forms of the latter.

In Figure 1, the reference numeral 10 designates the base of a centrifugal extractor on which is mounted in vertical position a tubular pedestal 12 rigidly secured to the base 10 as by means of bolts 14 extending through flanges 16 formed at the bottom of the pedestal. The inner wall of the pedestal 12 is provided intermediate its ends with a radially inwardly projecting flange 18 having an opening of internal diameter sufficiently large to receive the main body of a hollow cylindrical housing 20 with ample clearance therebetween. The housing 20 is provided on its outer periphery with a radially outwardly projecting flange 22 of such dimensions as to slidably fit within the upper portion of the pedestal 12 with ample clearance but overlapping the flange 18 throughout the majority of its horizontal area. A pair of resilient annular rings 24 and 26 of rubber or the like is assembled upon the housing 20 above and below the flange 22 in such manner that when the housing is fitted into the pedestal 12, it will be supported by the flange 18 acting through the ring 26. The shock mounting of the housing 20 is completed by means of an annular locking ring 28 threadedly engaged as at 30 with the upper end of the pedestal 12 and bearing against the top of the ring 24. A suitable sliding ring or washer 32 of metal or the like is preferably provided between the base of the locking ring 28 and the top surface of the ring 24 to prevent binding therebetween.

The bottom end of the housing 20, as illustrated in Figure 1, is closed by a cap piece 36 held in place as by means of suitable stud bolts 38. The cap piece 36 is suitably formed to receive a lower antifriction bearing shown as comprising an outer race 40 and an inner race 42 carrying a plurality of balls 44 therebetween. At its upper end the housing 20 is suitably counterbored as indicated by numeral 45 to receive an upper bearing comprising an outer race 46 resting upon the shoulder 47 of the counterbore and an inner race 48 between which are mounted a plurality of balls 50. The extractor drive shaft 52 is rotatably mounted in both the upper and lower bearings, the shaft being suitably turned to provide shouldered portions engageable with the inner races 42 and 48 of the lower and upper bearings, respectively. It will be understood that the upper portion of the drive shaft 52 is adapted to be connected to the basket or other laundry container (not shown) of a centrifugal extractor and for this purpose is tapered as indicated by reference numeral 53 and provided with an externally threaded end portion 55.

The extractor drive shaft 52 is adapted to be rotated by means of a hollow cylindrical pulley 54 having a bushing 56 at its top end adjustably secured to the shaft 52 in any convenient manner as by means of a setscrew 60. The pulley 54 extends downwardly in spaced relation around the pedestal 12 and the housing 20 and is provided at its lower portion with a plurality of notches or grooves 62 adapted to receive a suitable driving belt or belts 64 (Figure 2). At its top inner portion the pulley 54 is provided with a plurality of inwardly extending radial vanes 66 (Figure 1) located adjacent to a plurality of apertures 68 formed in the side wall of the pulley 54. The vanes 66 serve to produce a circulation of cooling air around the pedestal 12 and bearing housing 20 through the apertures 68 and the open bottom 70 of the pulley. Additional apertures 72 are provided in the side wall of the pulley 54 in order to permit the insertion of a special spanner wrench or the like to engage the operating portion 74 of the locking ring 28 for threading the latter into and out of the top end of the pedestal 12.

Referring again to Figure 1 it will be noted that the interior of the housing 20 above the lower bearing constitutes a substantially closed container designated generally by reference numeral 78 adapted to be partially filled with a suitable lubricating oil 80. It will also be noted in Figure 1 that the shaft 52 is provided with a longitudinal axial bore 82 therein extending substantially completely through the shaft and constituting an internal oil reservoir for the bearing assembly. At its top end the bore 82 is provided with a closure 84 preferably threaded into the end of the shaft 52 and having a suitable air vent 86 permitting restricted air flow through the closure to prevent an air lock within the reservoir. At its bottom end the bore 82 is open to a space 88 in the cap piece 36 in order to permit lubricating oil to circulate freely between the bore 82 and the space 78 around the lower bearings 44. A plurality of radial passages 90 extend transversely through the shaft 52 adjacent the lower end of the latter and serve to connect the axial bore 82 with the interior of the housing 20 above the lower bearing. As will be hereinafter more fully explained in connection with the description of the operation of the device, the passages 90 serve to supply lubricating oil from the bore 82 to the space 78 by positive centrifugal action when the shaft 52 is rotating.

In the preferred form of apparatus illustrated in Figure 1 there is also provided means for positively rotating the oil 80 within the housing 20 in the form of a plurality of longitudinal grooves 92 formed on the outer periphery of the shaft 52 adjacent its lower end just above the passages 90. A helical member 94 is secured in any convenient manner within the housing 20 in substantially continuous contact with the inner peripheral wall of the latter but spaced from the shaft 52. The helical member 94 is inclined upwardly in the normal direction of rotation of the shaft 52 and serves to conduct oil to the upper bearing at such times as the shaft is in operation.

In the modified form of the device illustrated in Figure 5 the longitudinal grooves 92 have been eliminated and a plurality of vanes 96 substituted in place thereof. Under certain circumstances, as where the upper and lower bearings are spaced relatively far apart, the employment of the radially projecting vanes 96 may be found desirable in order to increase the positive rotation imparted to the oil within the housing as the shaft 52 is rotated to thereby increase the force available to raise the oil to the upper bearing.

In the modified form of housing illustrated in Figure 6 the helical member 94 has been replaced by a continuous ledge 98 formed integrally with the housing 20 and projecting inwardly from the inner periphery of the latter. In this form of the device the ledge 98 is provided at its inner edge with an upturned rim 100 forming with the ledge an oil guiding channel 102 which serves to retain the oil therein during its upward movement towards the upper bearing as the shaft 52 is rotated. Under certain other circumstances, as for example, where the distance between the upper and lower bearings is relatively small, it may be desirable to dispense entirely with both the helical member 94 and the ledge 98 and in Figure 7 there is illustrated another embodiment of the device wherein the upward movement of the oil to the upper bearing is accomplished by means of a helical groove 104 formed directly in the inner periphery of the housing 20.

With the exception of such differences as have been noted above in describing the various structures illustrated the operation of all the various embodiments of the device is substantially the same. Thus in Figure 1 when the shaft 52 is rotated by some outside power source through the medium of the belts 64 and pulley 54, the oil 80 within the space 78 inside the housing 20 is given a rotational movement by a combination of the action of the grooves 92 together with the molecular surface tension of the oil about the remainder of the shaft 52. Such rotation of the oil within the housing 20 also tends to throw it outwardly against the inner walls of the housing so that as the oil rotates it also is conducted by the helical member 94 in an upward direction so as to be splashed positively against the upper bearings 50. It has also been found in practice that as the shaft 52 is rotated, the oil within the housing 20 is agitated by either the grooves 92 or vanes 96 in such manner as to produce an oil vapor extending throughout substantially the entire space 78 thereby increasing the lubricating action upon the upper bearing. It will also be apparent that as the shaft 52 is rotated, the oil within the reservoir constituted by the bore 82 will be positively forced out of the passages 90 by centrifugal force to replenish the oil within the space 78 which has been forced upwardly to the upper bearing.

Referring to Figure 1 it will be apparent that when the shaft 52 is at rest the closing plug 84 may be readily unscrewed from the top end of the shaft to permit some type of measuring stick to be inserted within the bore 82 to determine the level of the oil therein. When the shaft 52 is motionless the level of oil within the bore 82 also constitutes a measure of the oil level within the space 78 which may thus be quickly determined without the necessity of disassembling the device in any way. If the oil level is found to be low in this manner it will also be clear that additional oil may be added through the bore 82 to replenish the system and bring the oil level within the space 78 up to the desired point. Manifestly any suitable type of permanent or semipermanent float gauge or the like (not shown) may be employed in conjunction with the bore 82 to give a continuous indication of the oil level within the bearing housing.

While several preferred embodiments of this invention have been described in detail, it will be obvious that numerous other modifications, alterations, and deviations will occur to one skilled in the art without departing from the spirit of the invention. It is also to be understood that numerous changes can be made in size, materials, and arrangement of parts without departing from the principles of the invention as set forth in the appended claims.

I claim:

1. In a drive assembly for a laundry machine extractor, a hollow cylindrical housing, longitudinally spaced upper and lower bearings in said housing, a shaft rotatably mounted in said bearings, an axial bore extending substantially completely through said shaft and constituting an internal oil reservoir, a vented closure for the upper end of said bore, a plurality of radial passages adjacent the lower end of said shaft connecting said axial bore with the interior of said housing, a plurality of longitudinal grooves formed in the outer periphery of said shaft adjacent the lower end thereof for rotating the oil within said housing, and a helix within said housing in substantially continuous contact with the latter but spaced from said shaft, said helix being inclined upwardly in the direction of rotation of said shaft for conducting oil to said upper bearing when said shaft is in operation.

2. A bearing assembly comprising a housing, upper and lower bearings in said housing, a shaft rotatably mounted in said bearings, the interior of said housing above said lower bearing constituting a substantially closed container adapted to be partially filled with lubricating oil, an axial bore extending substantially completely through said shaft and constituting an internal oil reservoir, a vented closure for the upper end of said bore, a plurality of radial passages adjacent the lower end of said shaft connecting said axial bore with the interior of said housing, a plurality of longitudinal grooves formed in the outer periphery of said shaft adjacent the lower end thereof for rotating the oil within said housing, and a helical member within said housing in substantially continuous contact with the latter but spaced from said shaft, said member being inclined upwardly in the direction of rotation of said shaft for conducting oil to said upper bearing when said shaft is in operation.

3. A bearing assembly comprising a housing, upper and lower bearings in said housing, a shaft rotatably mounted in said bearings, the interior of said housing above said lower bearing constituting a substantially closed container adapted to be partially filled with lubricating oil, a longitudinal bore in said shaft constituting an internal oil reservoir, a transverse passage adjacent the lower end of said shaft connecting said bore with the interior of said housing, a groove formed in the outer periphery of said shaft adjacent the lower end thereof for rotating the oil within said housing, and a helical member within said housing in substantially continuous contact with the latter but spaced from said shaft, said member being inclined upwardly in the direction of rotation of said shaft for conducting oil to said upper bearing when said shaft is in operation.

4. A bearing assembly comprising a housing, upper and lower bearings in said housing, a shaft rotatably mounted in said bearings, the interior of said housing above said lower bearing constituting a substantially closed container adapted to be partially filled with lubricating oil, a longitudinal bore in said shaft constituting an internal oil reservoir, a transverse passage adjacent the lower end of said shaft connecting said bore with the interior of said housing, said shaft having means adjacent the lower end thereof for rotating the oil within said housing, and helix means in said housing for conducting oil to said upper bearing when said shaft is in operation.

5. A bearing assembly comprising a housing, upper and lower bearings in said housing, a shaft rotatably mounted in said bearings, the interior of said housing above said lower bearing constituting a substantially closed container adapted to be partially filled with lubricating oil, said shaft having means adjacent the lower end thereof for rotating the oil within said housing and helix means in said housing for conducting oil to said upper bearing when said shaft is in operation.

6. A bearing assembly as set forth in claim 5 wherein the means for rotating the oil within the housing comprises a plurality of approximately radially projecting vanes on the lower portion of the shaft.

7. A bearing assembly as set forth in claim 5 wherein the helix means comprises a continuous groove formed in the inner periphery of the housing.

8. A bearing assembly as set forth in claim 5 wherein the helix means comprises a continuous ledge projecting integrally inward from the inner periphery of the housing and having an upturned rim at its inner edge to provide an oil guiding channel.

9. A bearing assembly comprising a housing, upper and lower bearings in said housing, a shaft rotatably mounted in said bearings, the interior of said housing above said lower bearing constituting a substantially closed container adapted to be partially filled with lubricating oil, an axial bore extending substantially completely through said shaft and constituting an internal oil reservoir, a vented closure for the upper end of said bore, a plurality of radial passages adjacent the lower end of said shaft connecting said axial bore with the interior of said housing, and helical means within said housing spaced from said shaft and inclined upwardly in the direction of rotation of said shaft for conducting oil to said upper bearing when said shaft is in operation.

NORVIN LEROY PELLERIN.

REFERENCES CITED

The following references are of record in the file of this patent:

UNITED STATES PATENTS

| Number | Name | Date |
| --- | --- | --- |
| 1,432,095 | Bartholemew | Oct. 1922 |
| 1,755,250 | Frisch | Apr. 22, 1930 |
| 1,837,020 | Defibaugh | Dec. 15, 1931 |
| 2,012,579 | Obayshi | Aug. 27, 1935 |
| 2,201,090 | Hardy | May 14, 1940 |